(12) United States Patent
Han

(10) Patent No.: US 10,276,151 B2
(45) Date of Patent: Apr. 30, 2019

(54) ELECTRONIC APPARATUS AND METHOD FOR CONTROLLING THE ELECTRONIC APPARATUS

(71) Applicant: SAMSUNG ELECTRONICS CO., LTD., Suwon-si (KR)

(72) Inventor: Jeong-ho Han, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 57 days.

(21) Appl. No.: 15/590,165

(22) Filed: May 9, 2017

(65) Prior Publication Data

US 2018/0005625 A1 Jan. 4, 2018

(30) Foreign Application Priority Data

Jun. 29, 2016 (KR) .................. 10-2016-0081523

(51) Int. Cl.
| | | |
|---|---|---|
| *G10L 15/22* | (2006.01) | |
| *G10L 15/06* | (2013.01) | |
| *G06T 7/215* | (2017.01) | |
| *G06F 3/01* | (2006.01) | |
| *G06K 9/00* | (2006.01) | |

(Continued)

(52) U.S. Cl.
CPC .............. *G10L 15/06* (2013.01); *G06F 3/017* (2013.01); *G06F 3/0304* (2013.01); *G06F 3/167* (2013.01); *G06K 9/00335* (2013.01); *G06K 9/00355* (2013.01); *G06N 99/005* (2013.01); *G06T 7/215* (2017.01); *G10L 15/065* (2013.01); *G10L 15/20* (2013.01); *G10L 25/63* (2013.01); *H04N 21/4223* (2013.01); *H04N 21/44218* (2013.01); *G06F 2203/011* (2013.01); *G06F 2203/0381* (2013.01); *G06K 9/00221* (2013.01); *G06K 9/42* (2013.01); *G10L 15/02* (2013.01); *G10L 15/07* (2013.01); *G10L 15/14* (2013.01); *G10L 21/01* (2013.01); *G10L 2015/227* (2013.01)

(58) Field of Classification Search
CPC ............... G06F 3/00; G06F 3/01; H04L 17/02
See application file for complete search history.

(56) References Cited

U.S. PATENT DOCUMENTS

| | | | |
|---|---|---|---|
| 7,827,032 B2 | 11/2010 | Braho et al. | |
| 9,570,086 B1 * | 2/2017 | Sanders | .................. G10L 15/22 |

(Continued)

FOREIGN PATENT DOCUMENTS

| | | |
|---|---|---|
| JP | 2007-41319 A | 2/2007 |
| JP | 2010-128015 A | 6/2010 |

(Continued)

*Primary Examiner* — Shreyans A Patel
(74) *Attorney, Agent, or Firm* — Sughrue Mion, PLLC

(57) ABSTRACT

An electronic apparatus is disclosed. The electronic apparatus includes an input unit configured to receive a user input, a storage configured to store a recognition model for recognizing the user input, a sensor configured to sense a surrounding circumstance of the electronic apparatus, and a processor configured to control to recognize the received user input based on the stored recognition model and to perform an operation corresponding to the recognized user input, and update the stored recognition model in response to determining that the performed operation is caused by a misrecognition based on a user input recognized after performing the operation and the sensed surrounding circumstance.

18 Claims, 10 Drawing Sheets

(51) Int. Cl.

| | | |
|---|---|---|
| *G10L 15/20* | (2006.01) | |
| *G06F 3/16* | (2006.01) | |
| *G06F 3/03* | (2006.01) | |
| *G06N 99/00* | (2019.01) | |
| *H04N 21/4223* | (2011.01) | |
| *H04N 21/442* | (2011.01) | |
| *G10L 15/065* | (2013.01) | |
| *G10L 25/63* | (2013.01) | |
| G06K 9/42 | (2006.01) | |
| G10L 15/02 | (2006.01) | |
| G10L 15/07 | (2013.01) | |
| G10L 15/14 | (2006.01) | |
| G10L 21/01 | (2013.01) | |

(56) References Cited

U.S. PATENT DOCUMENTS

| | | | | |
|---|---|---|---|---|
| 2006/0167696 | A1* | 7/2006 | Chaar | G10L 15/22 704/270 |
| 2007/0192095 | A1* | 8/2007 | Braho | G10L 15/01 704/232 |
| 2009/0002217 | A1* | 1/2009 | Kryze | G08C 17/02 341/176 |
| 2009/0002218 | A1* | 1/2009 | Rigazio | G08C 17/00 341/176 |
| 2011/0137137 | A1* | 6/2011 | Shin | A61B 5/0059 600/301 |
| 2011/0313768 | A1* | 12/2011 | Klein | G06F 3/017 704/251 |
| 2012/0058783 | A1* | 3/2012 | Kim | G06F 1/1626 455/456.2 |
| 2014/0195014 | A1* | 7/2014 | Lee | G06F 3/017 700/83 |
| 2014/0225825 | A1 | 8/2014 | Yamamoto et al. | |
| 2015/0088336 | A1* | 3/2015 | Shin | G06F 3/017 701/1 |
| 2015/0161984 | A1* | 6/2015 | VanBlon | G10L 15/063 704/244 |
| 2015/0261318 | A1* | 9/2015 | Scavezze | G06F 3/0346 345/158 |
| 2015/0348045 | A1* | 12/2015 | Agarwal | G06K 9/00248 705/44 |
| 2017/0124410 | A1* | 5/2017 | Cho | G06F 3/017 |
| 2017/0193097 | A1* | 7/2017 | Cramer | G06F 17/30705 |

FOREIGN PATENT DOCUMENTS

| | | |
|---|---|---|
| JP | 2015-141253 A | 8/2015 |
| KR | 10-1597922 B1 | 2/2016 |
| KR | 10-2016-0027728 A | 3/2016 |
| KR | 10-2016-0030168 A | 3/2016 |

* cited by examiner

FIG. 3

| USER MOTION | RESULT OF MOTION RECOGNITION | |
|---|---|---|
| (NO INPUT) | (NO INPUT) | |
| LEFT-SWIPE | LEFT-SWIPE | |
| HAND RETURN | (NO INPUT) | |
| (NO INPUT) | (NO INPUT) | |
| LEFT-SWIPE | LEFT-SWIPE | |
| HAND RETURN | RIGHT-SWIPE | |
| LEFT-SWIPE | LEFT-SWIPE | MISRECOGNITION CANDIDATE SECTION |
| HAND RETURN | RIGHT-SWIPE | |
| LEFT-SWIPE | LEFT-SWIPE | |
| HAND RETURN | RIGHT-SWIPE | |
| (NO INPUT) | (NO INPUT) | |

FIG. 4

| USER MOTION | RESULT OF MOTION RECOGNITION | NON-RECOGNITION-BASED INPUT DEVICE (REMOTE CONTROLLER) |
|---|---|---|
| (NO INPUT) | (NO INPUT) | |
| LEFT-SWIPE | LEFT-SWIPE | |
| HAND RETURN | (NO INPUT) | |
| (NO INPUT) | (NO INPUT) | |
| LEFT-SWIPE | LEFT-SWIPE | |
| HAND RETURN | RIGHT-SWIPE | |
| LEFT-SWIPE | LEFT-SWIPE | |
| HAND RETURN | RIGHT-SWIPE | |
| LEFT-SWIPE | LEFT-SWIPE | |
| HAND RETURN | RIGHT-SWIPE | |
| (NO INPUT) | (NO INPUT) | PRESS LEFT KEY |

MISRECOGNITION CANDIDATE SECTION

FIG. 5

| USER MOTION | RESULT OF VOICE RECOGNITION | RESULT OF EMOTION RECOGNITION |
|---|---|---|
| (NO INPUT) | (NO INPUT) | NORMAL |
| a | A | NORMAL |
| a | A | NORMAL |
| b | B | NORMAL |
| (NO INPUT) | (NO INPUT) | NORMAL |
| a | B | NORMAL |
| a | B | UPSET/ANNOYED (WEAK) |
| a | B | UPSET/ANNOYED (MIDDLE) |
| a | B | UPSET/ANNOYED (STRONG) |
| a | A | UPSET/ANNOYED (STRONG) |
| (NO INPUT) | (NO INPUT) | NORMAL |

MISRECOGNITION CANDIDATE SECTION

ELECTRONIC APPARATUS AND METHOD FOR CONTROLLING THE ELECTRONIC APPARATUS

CROSS-REFERENCE TO RELATED APPLICATION

This application claims priority from Korean Patent Application No. 10-2016-0081523, filed in the Korean Intellectual Property Office on Jun. 29, 2016, the disclosure of which is incorporated herein by reference in its entirety.

BACKGROUND

1. Field

Aspects of the exemplary embodiments relate to an electronic apparatus and a control method thereof, more particularly, to an electronic apparatus which identifies a misrecognized voice input or a misrecognized motion input using user emotion information and a control method thereof.

2. Description of Related Art

As an electronic technology develops and user needs are diversified, various types of electronic apparatuses have been developed. Recently, the technology of controlling an electronic apparatus through a user voice or a user motion has appeared, and a variety of interfaces for controlling an electronic apparatus through a user voice and a user motion have been developed and used in various electronic apparatuses.

In general, with respect to a voice recognition or a motion recognition, if the situation that has not been considered in the stage of development of a recognition device occurs when the device is actually used, a voice or a motion is often misrecognized unexpectedly.

In the related art, in order to correct a voice recognition error or a motion recognition error, all user inputs are transferred to an external server, a user identifies a misrecognition manually, and the identified result is used as data for improving performance of a recognition device, or a user confirms whether or not a recognition is successful for every recognition result and a setting value of a device is adjusted by the confirming.

The method of identifying a misrecognition manually by a user after transferring all user inputs to an external server has a high accuracy in identification of a misrecognition because the determination of a misrecognition is directly conducted by a user. However, the method has a disadvantage that a large cost (a storage space and workforce) and time are required in the process of collecting and identifying data. Further, user convenience reduces in the case where a user needs to confirm every recognition result as a user should answer every question for confirming whether a recognition is successful.

SUMMARY

An aspect of exemplary embodiments relates to an electronic apparatus and a control method thereof, more particularly, to an electronic apparatus which identifies a misrecognized voice input or a misrecognized motion input using user emotion information and a control method thereof.

According to an exemplary embodiment, an electronic apparatus is provided, the electronic apparatus including an input unit configured to receive a user input, a storage configured to store a recognition model for recognizing the user input, a sensor configured to sense a surrounding circumstance of the electronic apparatus, and a processor configured to control to recognize the received user input based on the stored recognition model and to perform an operation corresponding to the recognized user input, and update the stored recognition model in response to determining that the performed operation is caused by a misrecognition based on a user input recognized after performing the operation and the sensed surrounding circumstance.

The processor may not update the stored recognition model in response to determining that the user is in a predetermined emotional state according to the user input recognized after performing the operation and that the determined predetermined emotional state is caused by the surrounding circumstance by considering the sensed surrounding circumstance.

The processor may determine that the performed operation is caused by a misrecognition in response to receiving a user command corresponding to another control means which is different from the received user input within a predetermined time after performing the operation.

The processor may determine whether a plurality of operations are caused by a misrecognition in response to the plurality of operations being consecutively performed according to a user input within a predetermined time interval.

The processor may determine whether a plurality of operations are caused by a misrecognition in response to the plurality of operations being consecutively performed according to a user input within a predetermined time interval and determining that a degree of a certain emotion of the user gradually increases based on the user input recognized while the plurality of operations are performed.

The sensor may sense at least one of temperature, humidity and noise.

The electronic apparatus according to an exemplary embodiment may further include a communication interface configured to communicate with an external display apparatus, and the processor may transmit an image corresponding to the recognized user input to the external display apparatus through the communication interface.

The electronic apparatus according to an exemplary embodiment further may include a display configured to display an image corresponding to the recognized user input, and the processor may determine whether the performed operation is caused by a misrecognition by further considering a type of an image being displayed through the display.

The processor may update the stored recognition model based on information on an operation that is determined as an operation caused by a misrecognition.

The storage may store recognition models for a plurality of users, each recognition model of the recognition models corresponding to a user of the plurality of users, and the processor may determine a user corresponding to the received user input, and update the recognition model corresponding to the determined user among the stored recognition models in response to determining that the operation performed according to the received user input is caused by a misrecognition.

The input unit may include at least one of a photographing unit which photographs a user and a microphone which receives a user voice.

A control method for controlling an electronic apparatus includes receiving a user input, recognizing the received user input based on a recognition model for recognizing a user input which is pre-stored in the electronic apparatus and performing an operation corresponding to the recognized user input, sensing a surrounding circumstance of the electronic apparatus, determining whether the performed operation is caused by a misrecognition based on a user input recognized after performing the operation and the sensed surrounding circumstance, and updating the stored recognition model in response to determining that the performed operation is caused by a misrecognition.

The determining may include determining that the performed operation is not caused by a misrecognition in response to determining that the user is in a predetermined emotional state according to the user input recognized after performing the operation and that the determined predetermined emotional state is caused by the surrounding circumstance by considering the sensed surrounding circumstance.

The determining may include determining that the performed operation is caused by a misrecognition in response to receiving a user command corresponding to a control means which is different from the received user input within a predetermined time after performing the operation.

The determining may include determining whether a plurality of operations are caused by a misrecognition in response to the plurality of operations being consecutively performed within a predetermined time interval.

The determining may include determining whether a plurality of operations are caused by a misrecognition in response to the plurality of operations being consecutively performed according to a user input within a predetermined time interval and determining that a degree of a certain emotion of the user gradually increases based on the user input recognized while the plurality of operations are performed.

The performing an operation corresponding to the recognized user input may include displaying an image corresponding to the recognized user input through a display of the electronic apparatus.

The determining may include determining whether the performed operation is caused by a misrecognition by further considering a type of an image being displayed through a display of the electronic apparatus.

The updating the stored recognition model may include updating the stored recognition model based on information on an operation determined as an operation caused by a misrecognition.

A non-transitory recording medium in which a program for performing a control method for controlling an electronic apparatus is stored is provided, the method including receiving a user input, recognizing the received user input based on a recognition model for recognizing a user input which is pre-stored in the electronic apparatus and performing an operation corresponding to the recognized user input, sensing a surrounding circumstance of the electronic apparatus, determining whether the performed operation is caused by a misrecognition based on a user input recognized after performing the operation and the sensed surrounding circumstance, and updating the stored recognition model in response to determining that the performed operation is caused by a misrecognition.

BRIEF DESCRIPTION OF THE DRAWINGS

FIGS. 3 to 5 are diagrams illustrating a method for determining a candidate of an operation caused by a misrecognition according to various exemplary embodiments;

DETAILED DESCRIPTION

Figure 1:
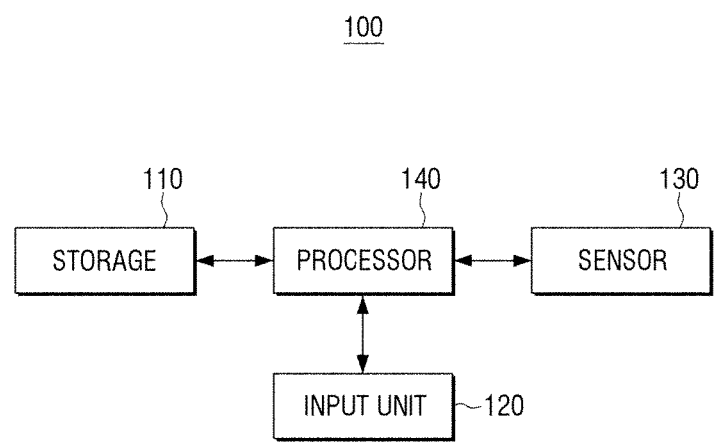
FIG. 1 is a block diagram illustrating a configuration of an electronic apparatus according to an exemplary embodiment.

Hereinafter, the terms used in the exemplary embodiments will be briefly described before describing the exemplary embodiments in detail.

The terms used in an exemplary embodiment are defined in consideration of a function described in an exemplary embodiment, and the terms may vary according to an intention of a technician practicing in the pertinent art, an advent of new technology, etc. In specific cases, terms may be chosen arbitrarily, and in this case, definitions thereof will be described in the description of the corresponding disclosure. Therefore, the terms used in the description should not necessarily be construed as simple names of the terms, but be defined based on meanings of the terms and overall contents of the present disclosure.

The exemplary embodiments may vary, and may be provided in different exemplary embodiments. Various exemplary embodiments will be described with reference to accompanying drawings. However, this does not necessarily limit the scope of the exemplary embodiments to a specific embodiment form. Instead, modifications, equivalents and replacements included in the disclosed concept and technical scope of this description may be employed. Also, well-known functions or constructions are not described in detail since they would obscure the present disclosure with unnecessary detail.

The terms such as "first" and "second" may be used to explain various elements, but the elements should not be limited by these terms. The terms are used solely for the purpose of distinguishing one element from another element.

A singular term includes a plural form unless otherwise indicated. It should be understood that the terms "include" or "have" used in the exemplary embodiments of the present disclosure are to indicate the presence of features, numbers, steps, operations, elements, parts, or a combination thereof described in the specifications, and do not preclude the presence or addition of one or more other features, numbers, steps, operations, elements, parts, or a combination thereof.

In an exemplary embodiment, 'a module' or 'a unit' performs at least one function or operation, and may be realized as hardware, software, or combination thereof. Further, except the "modules" or "units" that have to be implemented as certain hardware, a plurality of "modules" or a plurality of "units" may be integrated into at least one module and realized as at least one processor.

In an exemplary embodiment, in the case where a part is "connected" to another part, the case also includes a case where the part is "electrically connected" to the other part with another element interposed therebetween. Further, when a certain portion is stated as "comprising" a certain element, unless otherwise stated, this means that the certain portion may include another element, rather than foreclosing the same.

Hereinafter, the exemplary embodiments of the present disclosure will be described in greater detail with reference to the accompanying drawings, so that a person skilled in the art can easily implement the exemplary embodiments. However, the exemplary embodiments may be implemented as various different forms, and the present disclosure is not limited to the exemplary embodiments described herein. In the drawings, parts that are not relevant to the description may be omitted to clearly describe the embodiments, and like drawing reference numerals are used for the like elements throughout the specification.

Hereinafter, the present disclosure will be described in more detail with reference to the accompanying drawings.

FIG. 1 is a block diagram illustrating a configuration of an electronic apparatus according to an exemplary embodiment. The electronic apparatus 100 according to an exemplary embodiment may perform a control operation based on a user input, but not limited thereto, and the electronic apparatus 100 may be implemented as a TV, a smartphone, a set-top box, a computer, a navigation device, or the like. The electronic apparatus 100 may, for example, perform a control operation based on a user voice or based on a user motion, or may perform a control operation based on a user voice and a user motion.

Meanwhile, the term "voice" used in the exemplary embodiments may represent everything that a user says. The "voice" may represent not only a word or a sentence by which a user intends to transfer a certain meaning but also a meaningless representation means such as an onomatopoeic and mimetic words and a sigh, or the like, and all the user utterances which can be recognized audibly are voices. Also, the term "motion" used in the exemplary embodiments may represent everything that moves as time goes by. The motions are not only movements of a body part of a user such as a hand, but also changes in a user body which can be recognized visually such as a change in expression on a face and a change in color of a face.

Referring to FIG. 1, the electronic apparatus 100 may include a storage 110, an input unit 120, a sensor 130 and a processor 140.

The storage 110 may store various programs and data required for operating the electronic apparatus 100. The storage 110 may be implemented as a non-volatile memory, a volatile memory, a flash memory, a hard disk drive (HDD) or a solid state drive (SSD), or the like. The storage 110 may be accessed by the processor 140, and reading/recording/modifying/deleting/updating of data may be performed by the processor 140. The term 'storage' in the exemplary embodiments may mean not only the storage 110 but also a ROM (not illustrated) and a RAM (not illustrated) inside the processor 140, or a memory card (not illustrated) equipped in the electronic apparatus 110 (e.g., a micro SD card, a memory stick and a USB).

Various recognition models for recognizing a user input may be stored in the storage 110. If the electronic apparatus 100 is implemented as an apparatus which can recognize at least one of a user voice and a user motion, various recognition models for recognizing at least one of a voice and a motion may be stored in the storage 110. Herein, the voice recognition model or the motion recognition model is a sort of an algorithm that is statistically modeled to recognize a voice or a motion. The recognition model for voice recognition may include a sound model for modeling a signal characteristic of voices, comparing the characteristics, and measuring and recognizing the similarity and a language model for modeling a linguistic sequence relationship of a word or a syllabus corresponding to a recognized word. A Hidden Markov model (HMM) may be an example of a model for recognizing a voice or a motion, but the model is not limited thereto.

Meanwhile, it is described that a recognition model is stored in the electronic apparatus 100 in the aforementioned examples, but it is also possible to use a recognition model stored in an external server. For example, the electronic apparatus 100 may transfer a voice input or a motion input to an external server, and a voice recognition or a motion recognition may be performed in the external server and the recognition result may be transmitted to the electronic apparatus 100.

Further, in the exemplary embodiments, it is also possible to use various conventional algorithms which do not recognize a voice or a motion based on a model.

The storage 110 may store all the information that is input in the electronic apparatus 100 such as information on a user input received through the input unit 120 and information on a surrounding circumstance sensed by the sensor 130 and the like, and such information may be used for updating a recognition model later.

The input unit 120 is a component for receiving a user input. For example, the input unit 120 may include at least one of a photographing unit (e.g., a camera) which can photograph a user to receive a user motion input and a microphone which can receive a user voice to receive a user voice input.

The input unit 120 may receive a user command corresponding to a control means which is different from a user voice and a user motion. For example, the input unit 120 may include a remote controller signal receiving device for receiving light of an IR signal from a remote controller.

Meanwhile, it is described that the input unit 120 is included in the electronic apparatus 100 and the electronic apparatus 100 directly receives a user input. However, according to another exemplary embodiment, the electronic apparatus 100 may receive a user input through an external device. For example, the electronic apparatus 100 may receive a user voice input or a user motion input through an external electronic device such as a smartphone equipped with a microphone or a camera and a wearable device (a smart watch, etc.).

The sensor 130 is a component for sensing a surrounding circumstance of the electronic apparatus 100. The surrounding circumstance may represent all the elements that can affect emotion of a user. For example, the surrounding circumstance may include temperature, humidity, noise, vibration, etc. In this case, the sensor 130 may include at least one of a temperature measuring device, a humidity measuring device, a noise measuring device, a vibration measuring device, an acceleration sensor, a gyro sensor, a gravity sensor, and so on.

The sensor 130 may further include a bio-signal measuring sensor. The bio-signal measuring sensor may be, for instance, a device which generates a photoplethysmography (PPG) signal, an electrocardiogram (ECG) signal, a blood volume pulse (BVP) signal, a heart rate variability (HRV) signal, an electroencephalography (EEG) signal, an electromyography (EMG) signal, or an electrooculography (EOG) signal.

Meanwhile, it is described that the sensor 130 is included in the electronic apparatus 100, but according to another exemplary embodiment, the electronic apparatus 100 may receive at least one of the state of a surrounding circumstance sensed through an external device and a bio-signal. The electronic apparatus 100 may, for example, receive information sensed through an external temperature measuring device, a humidity measuring device, a noise measuring device, a bio-signal measuring sensor, etc., or may receive various information related to a surrounding circumstance from an external server. For instance, the electronic apparatus 100 may receive information on current weather from a server which provides weather information.

The processor 140 is a component for controlling overall operations of the electronic apparatus 100. The processor 140 may include a CPU, a RAM, a ROM and a system buss. The processor 140 may include one CPU, or may be implemented by a plurality of CPUs (or a DSP, SoC, etc.).

The processor 140 may recognize a user input that is input through the input unit 120 based on a recognition model stored in the storage 110, and perform an operation corresponding to the recognized user input.

In the storage 110, a recognized user voice or a recognized user motion and information on a matching relation between operations corresponding to the recognized voice and the recognized motion may be stored. For example, when the electronic apparatus 100 is a TV, if a voice such as "what is the name of the current program?" is received and recognized, the processor 140 may output a message such as "the title of the program that you asked is ○○○," in voice or text in response to the question based on information on the matching relation stored in the storage 110. As another example, if a motion that a user raises his/her hand is sensed, the processor 140 may perform a channel-up operation based on the information on the matching relation stored in the storage 110.

If the electronic apparatus 100 includes a display (not illustrated), the processor 140 may control the display to display an image corresponding to a recognized user input.

Further, the processor 140 may transmit a control command to the electronic apparatus as an operation command corresponding to a recognized user input. For example, if the electronic apparatus 100 is a smartphone that can communicate with an air conditioner, and a voice such as "please turn on the air conditioner,' is recognized, the processor 140 may transmit a turn-on command to the air conditioner. As another example, if the electronic apparatus 100 is a set-top box, the processor 140 may transmit an image corresponding to a recognized user voice or a recognized user motion to an external display apparatus connected to the electronic apparatus 100.

Figure 2:
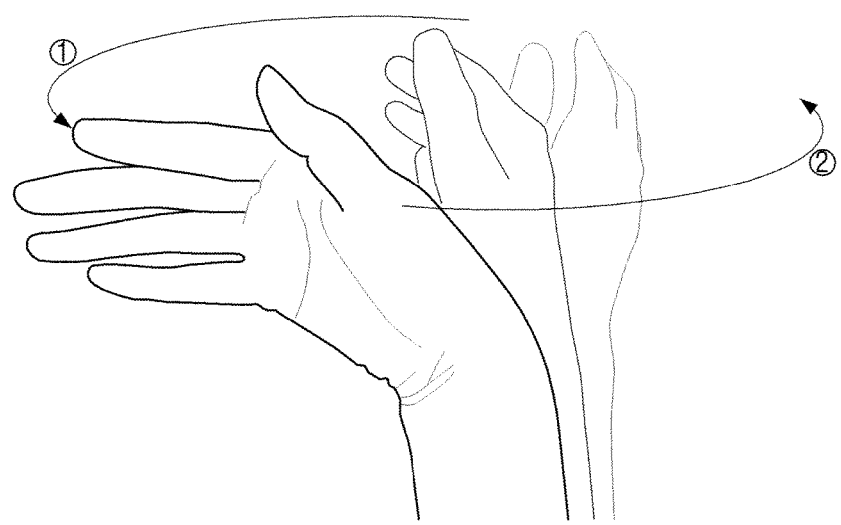
FIG. 2 is a diagrams illustrating an example of a motion recognition error.

Meanwhile, with regard to a recognition technology such as voice recognition or motion recognition, if any situation or condition that has not been considered in the stage of development of a recognition device arises, a misrecognition often occurs irrespective of a user intention. For example, as illustrated in FIG. 2, when a user performs a left-swipe motion, the user moves his/her hand to the left from an initial position as shown in ① of FIG. 2. After performing the motion that the user wants to perform, the user naturally moves the hand to the original position. This process is illustrated in ② of FIG. 2. Generally, a user moves his/her hand to an original position after performing a left-swipe motion because, if a user maintains the position of the hand that has been moved to the left, the user may feel uncomfortable. However, the motion of moving a hand to an original position has a problem that a recognition device might recognize the motion as a right-swipe, which is a misrecognition.

Therefore, it is necessary to improve performance of a recognition device by identifying such a misrecognition. To achieve this, according to an exemplary embodiment, in response to a user input, the processor 140 may update a recognition model stored in the storage 110 if it is determined that a performed operation is caused by a misrecognition based on a user input recognized after performing an operation and a sensed surrounding circumstance.

If an operation which is different from a user input is performed, a user would unconsciously respond to the operation and express a certain emotion. Therefore, it can be assumed that a misrecognition has occurred by analyzing such a response of a user, and thus, exemplary embodiments may be described based on the above example.

The processor 140 may determine an emotional state of a user based on a user input recognized after performing an operation.

For instance, if a word or a sentence expressing a certain state is included in a user voice recognized after performing an operation, that is, if words such as "well?," "what is this?" "what's happening?" "are you kidding me?," or a sigh and a swear word, etc. are included in a voice, the processor 140 may determine the emotional state of a user as being discontented.

An emotional state determined based on such a voice may be quantified. For example, if an emotional state is 0, it indicates that a user is very contented, and as the value increases, it indicates that a user becomes discontented.

Further, if a certain action is included in a user motion recognized after performing an operation, that is, for example, if a user expresses a facial expression such as anger, discouragement, tiresomeness, sadness, astonishment, etc., or if a user motion includes an action such as a face turning red, a user touching his/her neck or shaking his/her head, etc., the processor 140 may determine that the user is discontented.

The emotional state determined based on such a motion may also be quantified. For example, if the emotional state is 0, it indicates that a user is very contented, and as the value increases, it indicates that a user becomes discontented.

The processor 140 may also determine an emotional state of a user by analyzing a bio-signal of the user which is sensed by the sensor 140 or received from an external device (e.g., a wearable device worn by the user).

For example, the processor 140 may analyze whether a sensed bio-signal of a user corresponds to a certain predetermined bio-signal such as a bio-signal indicating excitement, a bio-signal indicating tiredness, a bio-signal indicating astonishment, and a bio-signal indicating annoyance.

An emotional state determined from such a bio-signal may also be quantified. For example, if the emotional state is 0, it indicates that a user is very contented, and as the value increases, it indicates that a user becomes discontented.

The processor 140 may determine an emotional state of a user considering a voice, a motion, and a bio-signal, respectively, or may ultimately determine an emotional state of the user considering at least two of a voice, a motion and a bio-signal.

Meanwhile, an emotional state of a user may be affected by a surrounding circumstance. For example, in summer, if weather is hot and humid, a user may feel unpleasant and stressful regardless of operation of the electronic apparatus 100. Therefore, in the exemplary embodiment, it may be determined whether an emotional state of a user is caused by a surrounding circumstance or caused by an operation of the electronic apparatus 100 resulted from a misrecognition considering not only an action of the user but also a surrounding circumstance.

For example, the processor 140 may determine whether a performed operation is caused by a misrecognition considering information on at least one of a state of a surrounding circumstance sensed by the sensor 130 and a state of a surrounding circumstance received from an external device.

Further, besides a surrounding circumstance such as temperature, humidity, etc., a content (an image and/or a sound) provided by the electronic apparatus 100 or another electronic apparatus to a user may also affect an emotional state of the user. For instance, if a horror movie, a heinous crime news, etc. are output in the electronic apparatus 100 or another electronic apparatus, an emotional state of a user who watches such a content may appear as astonishment, terror, or the like.

In this case, the processor 140 may consider a type of a content that is currently output in the electronic apparatus 100 or another electronic apparatus and determine whether a performed operation is caused by a misrecognition.

The processor 140 may also determine a surrounding stress level of a user based on at least one of a surrounding circumstance and a content provided to the user. The processor 140 may change a reference value for determining an emotional state of a user with respect to an operation performed by the electronic apparatus 100 based on the determined stress level.

For example, if the stress level is 0, the reference value may be determined as 5. If the stress level is 2, the reference value may be determined as 7 that is increased by 2 from 5. Considering such an example, if it is assumed that an emotional state determined based on a user voice, a user motion and a bio-signal, etc. is 6 and when the stress level is 0, the processor 140 may determine that a user is discontented with an operation performed by the electronic apparatus 100 and that the performed operation is caused by a misrecognition because the determined emotional state of the user exceeds a reference value. However, if the stress level is 2, the determined emotional state of a user does not exceed a reference value, and thus, the processor 140 may determine that the user is contended with an operation performed by the electronic apparatus 100 and that the performed operation is properly recognized and performed.

As described above, according to the exemplary embodiment, it may be determined whether discontentedness of a user is caused by a misrecognition or caused by another reason, and accordingly, a misrecognition may be identified more accurately.

Meanwhile, as described above, a misrecognition may be determined by determining an emotional state of a user based on a user voice, a user motion or a bio-signal, but if the situation where a user expresses an intention that the user does not want to use a voice recognition or a motion recognition any more occurs after the above operation is performed, it may be determined that a misrecognition has occurred. For exemplary, if a user uses a control means such as a remote controller which is not based on a voice or a motion while the user tries a voice recognition or a motion recognition, it may be considered as an intention that the user does not want to use a voice recognition or a motion recognition.

For example, if a user command, that is, a user command corresponding to a control means which is different from a previous input user voice or a previous input user motion is received through the input unit 110 within a predetermined time after the electronic apparatus 100 performs an operation, the processor 140 may determine that the performed operation is caused by a misrecognition. Herein, the control means which is different from a user voice and a user motion is a control means in which a user intention can be reflected relatively accurately such as a remote controller, a keyboard, a mouse, a touch pad, or the like.

According to another exemplary embodiment, in order to accurately determine whether a misrecognition has occurred or not and to reduce memory consumed in determination of a misrecognition, the processor 140 may determine whether a misrecognition has occurred only when it is predicted that a misrecognition has occurred by considering an emotional state, a surrounding circumstance, etc. as described above.

For instance, if there has been a user input repeatedly for a short period of time, it may be predicted that a misrecognition has occurred. The specific example situation will be described with reference to FIG. 3.

FIG. 3 illustrates the situation where a user is repeating a motion as a misrecognition has occurred while the user puts his/her hand back to an original position after the user performs a left-swipe. Up to the third line in FIG. 3, it is illustrated that a motion recognition is performed properly when the user performs a left-swipe. From the sixth line in FIG. 3, it is illustrated that while the user puts his/her hand back to an original position after the user performs a left-swipe, the user consecutively inputs the left-swipe motion because the left-swipe is recognized as a right-swipe, which is a misrecognition.

Therefore, if a plurality of operations are consecutively performed in response to a user input within a predetermined time interval, the processor 140 may perform a determination of whether a misrecognition has occurred considering an emotional state, a surrounding circumstance, etc. with respect to the plurality of operations as described above.

Further, if there is an input through a control means which is different from the control means of a previously input user command within a predetermined time after operations corresponding to a user input are performed repeatedly, it may be predicted that a misrecognition has occurred. The specific example situation will be described with reference to FIG. 4.

FIG. 4 illustrates the situation where, after a user performs a left-swipe, a misrecognition has occurred multiple times while the user puts his/her hand back to an original position, and consequently, the user gives up using a motion recognition, and uses a different control means (a remote controller) and presses a left key that is a command that the user wants to give.

Therefore, if a user command corresponding to a control means which is different from the control means of a previously input user command is input through the input unit 110 after a plurality of operations corresponding to a user input are performed consecutively within a predetermined time interval, the processor 140 may perform a determination of whether a misrecognition has occurred considering an emotional state, a surrounding circumstance, etc. with respect to the plurality of operations as described above.

Further, in the case where an emotional state of a user gradually degrades while a user command is input repeatedly, it may be predicted that a misrecognition has occurred. The specific example situation will be described with reference to FIG. 5.

In FIG. 5, a user voice is represented by a lowercase alphabet, and the result of a voice recognition is represented by the same alphabet in upper case if the voice is properly recognized as a user intended. In FIG. 5, there is no change in a user emotion in the command recognition process (maintaining a normal state) because the first three user voices "a," "a," and "b" which are positioned on the top in FIG. 5 have been recognized properly as "A," "A," and "B."

However, with regard to the five consecutive user inputs "a," "a," "a," "a" and "a" which are positioned in the below, the first four inputs have been recognized as "B," "B," "B," "B" and "A," which are misrecognitions, and only the last input has been recognized properly. The user tried to transfer a command 'A,' but as a misrecognition occurred in a recognition device, the user has input the same commands consecutively until the command that the user wants to transfer is recognized. While inputting the same command repeatedly, the user may feel tired, and as the command that the user wants to transfer is not recognized repeatedly, the emotional state of the user may be changed such that the intensity of the emotion 'being upset/annoyed' increases from a normal state. When the command "A" that the user wants to transfer is recognized in the fifth try after inputting the command consecutively, the user may stop inputting the command and take a rest.

As shown in the command recognition process described above, if the user emotion changes rapidly to being stressful in consecutive command recognitions, it is highly likely that a misrecognition has occurred.

As such, if a plurality of operations are consecutively performed in response to a user input within a predetermined time interval, and it is determined that an emotional state of the user has been changed such that the degree of a predetermined certain emotion (e.g., annoyance and anger) increases gradually based on a user input such as a recognized voice or a recognized motion which are recognized while the plurality of operations are performed, the processor 140 may determine whether the plurality of operations are caused by a misrecognition.

The processor 140 may update a recognition model if it is determined that the performed operations are caused by a misrecognition. The update of a recognition model is to modify a recognition model referring to a user command input at the time when a misrecognition occurs and an improper operation is performed in response to the misrecognition.

The processor 140 may not update a recognition model if it is determined that a performed operation has not been caused by a misrecognition. That is, the processor 140 may not update a pre-stored recognition model if it is determined that the user is in a predetermined emotional state according to a user input recognized after an operation is performed, that is, according to at least one of a recognized user voice and a recognized user motion, and it is determined that the predetermined emotional state has been caused by a surrounding circumstance considering the sensed surrounding circumstance.

Meanwhile, according to the exemplary embodiment of updating a recognition model, the processor 140 may transmit information on an operation determined as caused by a misrecognition to an external server, and in the server, engineers update a recognition model using information collected as above. Then, the processor 140 may receive the updated recognition model from the server and update a recognition model stored in the storage 110.

The information on an operation determined as caused by a misrecognition may include information on a user input received when a misrecognition occurs, that is, information on a user voice or a user motion and an operation performed in response to a misrecognition in the electronic apparatus 100. If necessary, the information may further include information on an emotional state of a user and a surrounding circumstance.

According to another exemplary embodiment of updating a recognition model, the processor 140 itself may update a recognition model. That is, the processor 140 may update a recognition model by adjusting variable values of a recognition model stored in the storage 110 based on information on the case determined as a misrecognition. According to the exemplary embodiment, updating of a recognition model may be customized to each different user of the electronic apparatus 100.

Further, according to another exemplary embodiment, as there may be a plurality of users who use the electronic apparatus 100, the processor 140 may update a recognition model by customizing to each of the plurality of users.

The processor 140 may determine a user corresponding to a user input. For example, the processor 140 may determine a user by photographing the user at the time when a user input is received. Recognition models are stored in the storage 110 for each user, and the processor 140 may update a recognition model corresponding to the user who entered the user input among the recognition models stored in the storage 110 for each user if it is determined that an operation performed in response to the received user input is caused by a misrecognition.

Meanwhile, in the exemplary embodiment described above, it is described that the electronic apparatus 100 itself may update a recognition model according to a user characteristic, but such an operation may also be performed in an external server if the external server can manage a recognition model for each user.

Figure 6:
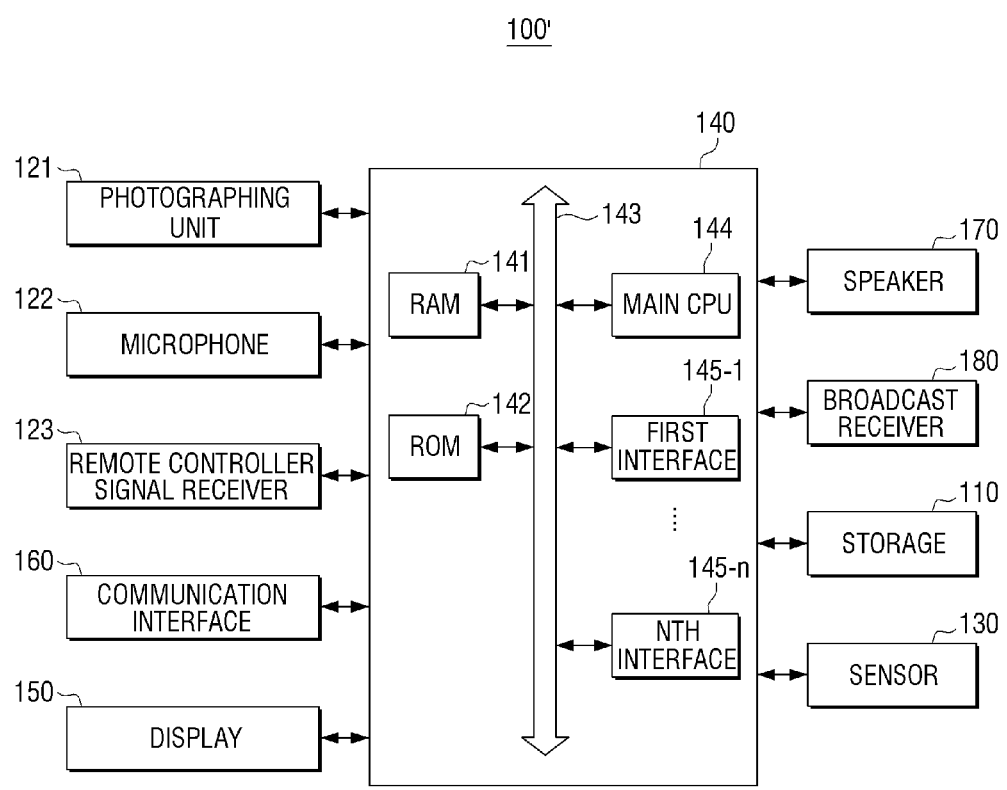
FIG. 6 is a block diagram illustrating a configuration of an electronic apparatus according to another exemplary embodiment.

FIG. 6 is a block diagram illustrating an electronic apparatus according to another exemplary embodiment.

Referring to FIG. 6, the electronic apparatus 100' may include the storage 110, a photographing unit 121, a microphone 122, a remote controller signal receiver 123, the sensor 130, the processor 140, a display 150, a communication interface 160 and a speaker 170 and a broadcast receiver 180. The description for the elements of the electronic apparatus 100 which have already been described above will be omitted.

In the storage 110, various programs, modules, etc. which are needed for the electronic apparatus 100' to operate are stored.

For example, in the storage 110, at least one of a face expression recognition module, a voice emotion recognition module which identifies an emotional state of a user based on a voice signal transmitted from a microphone, a bio-signal analyzation module which identifies an emotional state of a user based on a bio-signal measured by a bio-signal measuring sensor if the sensor is present, a user emotion determination module which ultimately determines an emotional state of a user based on all recognition results of recognizing human emotions using various methods, and a motion recognition module and a voice recognition module.

The photographing unit 121 is configured to photograph a user and generate a photographed image. The photographing unit 121 may be a camera. For example, the processor 140 may control the photographing unit 121 to photograph a user if a motion recognition is necessary, an emotional state of a user needs to be determined, or who a user is needs to be determined.

The microphone 122 is configured to receive a user voice input and generate a voice signal. The voice input through the microphone 122 may be used to control the electronic apparatus 100' which is based on a voice recognition, to determine an emotional state of a user, or to determine who a user is. For example, the processor 140 may perform a voice recognition and perform an operation corresponding to the recognized voice based on a voice signal collected in the microphone 122, and analyze the characteristic of the user voice and determine an emotional state of the user or determine who the user is.

The remote controller signal receiver 123 is configured to receive a control signal from a remote controller for controlling the electronic apparatus 100'. The control signal received through the remote controller signal receiver 123 may not only be used to control general operations of the electronic apparatus 100,' but also to determine whether a misrecognition has been occurred. For example, if a control signal is input through the remote controller signal receiver 123 after an operation corresponding to a voice input or a motion input, the processor 140 may determine that the performed operation is caused by a misrecognition.

The sensor 130 may sense a surrounding circumstance. For example, the sensor 139 may include various sensors such as a temperature sensor, a humidity sensor, a vibration sensor, a touch sensor, a geomagnetic sensor, a gyro-sensor, an acceleration sensor, etc. which can sense a surrounding circumstance.

The surrounding circumstance sensed by the sensor 130 may be used to determine the cause of an emotional state of a user. Meanwhile, the sensor 130 may further include a bio-signal measuring sensor to determine an emotional state of a user more accurately.

The display 150 is configured to display various screens including a menu or other messages with respect to functions provided by the electronic apparatus 100' according to a control by the processor 140.

The display 150 may be implemented as a liquid crystal display (LCD) for example, and in some cases, it may also be implemented as a cathode-ray tube (CRT), a plasma display panel (PDP), an organic light emitting diodes (OLED), a transparent OLED (TOLED), or the like. Further, the display 150 may also be implemented in a form of a touch screen which can sense a touch manipulation of a user.

The processor 140 may control the display 150 to display an image corresponding to a recognized user input. Further, the processor 140 may identify an image being currently displayed on the display 150, and use the image to determine the cause of an emotional state of a user.

The speaker 170 is configured to output not only various audio data processed in an audio processor (not illustrated) but also various alarm sounds, a voice message, etc.

The processor 140 may output a sound corresponding to a recognized user input through the speaker 170, and may also identify a sound output in the speaker 170 and use the sound to determine the cause of an emotional state of a user.

The processor 140 may determine the cause of an emotional state of a user based on a type and a genre of a content included in information on the content output by at least one of the display 150 and the speaker 170. The above information on a content may be provided by a content provider, a broadcasting server, a VoD providing server, an EPG providing server, or the like.

The communication interface 160 is configured to communicate with an external apparatus. The communication interface 160 may communicate with an external apparatus by various communication methods such as IEEE, Wi-Fi, Bluetooth, 3G, 4G, Near Field Communication (NFC), etc., and may include various communication chips such as a Wi-Fi chip, a Bluetooth chip, an NFC chip, a wireless communication chip, etc. The wireless communication chip refers to a communication chip which communicates according to various communication standards such as IEEE, ZigBee, 3rd Generation (3G), 3rd Generation Partnership (3GP), Long Term Evolution (LTE), or the like.

Meanwhile, it is described in FIG. 6 that the electronic apparatus 100' includes the photographing unit 121, the microphone 122 and the sensor 130, but even if those components are not provided in the electronic apparatus 100,' the communication interface 160 can be connected to an external photographing device, a microphone, a surrounding circumstance sensing device, a user bio-signal sensing device, a surrounding circumstance information providing server, and the like.

Also, it is described in FIG. 6 that the electronic apparatus 100' includes the display 150, but the electronic apparatus 100' may also be connected to an external device which performs a display function through the communication interface 150. In this case, the processor 140 may transmit an image to the external display apparatus through the communication interface 150, and particularly, may transmit an image corresponding to a recognized user input to an external display apparatus through the communication interface 150.

The electronic apparatus 100' itself may perform a recognition of a user input, but the communication interface 160 may be connected to an external server which perform a recognition of a user input such as a user motion or voice input.

The processor 140 may transmit a control command for controlling an external electronic device to perform an operation corresponding to a recognized user input through the communication interface 160.

The processor 140 may control the communication interface 160 to receive information on a content being currently output from an external device which outputs a content, and determine the cause of an emotional state of a user based on the received information.

The broadcast receiver 180 is configured to tune a broadcast channel, receive a broadcast signal and process the received signal, and the broadcast receiver 180 may include a tuner, a demodulator, an equalizer, a demultiplexer, etc. The broadcast receiver 180 may tune a broadcast channel according to control by the processor 140, receive a broadcast signal that a user wants to send, demodulate and equalize the received broadcast signal and de-mux the signal to audio data and additional data, etc.

The de-mux video data may be provided to an image processor (not illustrated). The image processor may perform various image processing operations with respect to provided video data such as noise filtering, frame rate conversion, resolution conversion, etc., and generate a frame to be output on a screen.

The de-mux audio data may be provided to an audio processor (not illustrated). The audio processor may perform various processing operations with respect to audio data such as decoding or amplifying, noise filtering, etc. . . . .

The processor 140 may include a RAM 141, a ROM 142, a main CPU 144, various interfaces 145-1~145-*n* and a bus 143. The RAM 141, the ROM 142, the main CPU 144 and the various interfaces 145-1~145-*n* may be connected to one another through the bus 143, and transmit to and receive from each other, various data and signals.

The first to nth interfaces 145-1-145-*n* may be connected to not only the components illustrated in FIG. 6 but also to the other components, and allow the main CPU 144 to access the components. For example, if an external device such as a USB memory is connected, the main CPU 144 may access the USB memory through the USB interface.

In the ROM 142, a command set, etc. for system booting may be stored. If a turn-on command is input and power is supplied, the main CPU 144 may copy an O/S stored in the storage 110 to the RAM 141 according to a command word stored in the ROM 142, execute the O/S and boot a system. Once the booting is completed, the main CPU 144 may copy various programs stored in the storage 110 to the RAM 141, execute the programs copied to the RAM 141, and perform various operations.

Although it is not illustrated in FIG. 6, the electronic apparatus 100' may include a port that can be connected to various input devices, and be connected to a keyboard, a mouse, etc., and also buttons may be provided in the electronic apparatus 100.' A user command input through such an input means may not only be used to control operations of the electronic apparatus 100,' but also be used to determine whether a user input such as a user voice or a user motion is misrecognized.

Figure 7:
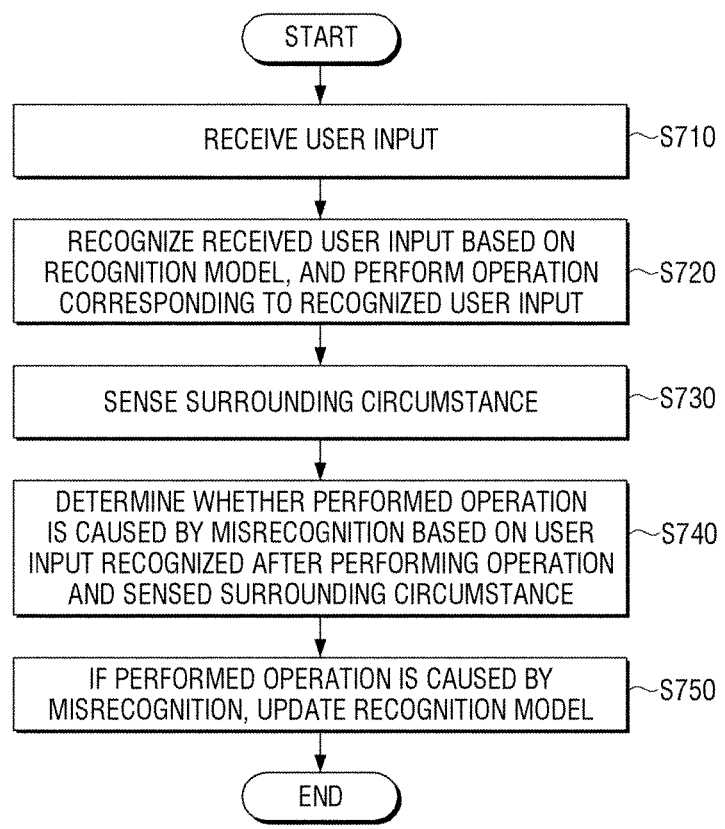
FIG. 7 is a flow chart describing a control method for controlling an electronic apparatus according to an exemplary embodiment.

FIG. 7 is a flow chart to illustrate a control method for controlling an electronic apparatus according to an exemplary embodiment. The control method of an electronic apparatus according to an exemplary embodiment may not only include the examples described through FIG. 7 but also the various exemplary embodiments described through FIG. 1 to FIG. 6. Therefore, the description for the elements that have already been described above will be omitted.

Referring to FIG. 7, an electronic apparatus may receive a user input (S710). The user input may be at least one of a user voice and a user motion.

Then, the electronic apparatus may recognize a user input based on a recognition model for recognizing a user input pre-stored in the electronic apparatus and perform an operation corresponding to the recognized user input (S720).

After that, the electronic apparatus may sense a surrounding circumstance of the electronic apparatus (S730).

According to an exemplary embodiment, the processor 140 may determine whether a user command has been input multiple times within a predetermined time interval and an operation corresponding to the user input has been performed, and if it is the case, the processor 140 may determine whether a misrecognition has occurred.

For example, the electronic apparatus may determine 'a consecutive command section' in which a user voice or a user motion is input multiple times within a predetermined time interval. For example, the electronic apparatus may, in response to a voice input or a motion input, determine whether a voice or a motion has been input within a predetermined time interval in the past. If there was no such an input, the electronic apparatus may determine the currently input voice or the currently input motion as an initial position of the consecutive command section. Also, with respect to voices or motions subsequently input, the electronic apparatus may determine whether the voices or the motions have been input within a predetermined time interval, and if it is determined that the predetermined time has been elapsed without any voice input or motion input, the electronic apparatus may determine the lastly input voice or the lastly input motion as the last position of the consecutive command section.

Further, the electronic apparatus may store information on what command has been input in the consecutive command section, and what operation has been performed in response to each input, and also store information on a motion, a voice, a user bio-signal and a surrounding circumstance which have been sensed after performing each operation as information on a consecutive command section.

Then, the electronic apparatus may determine whether the performed operation is caused by a misrecognition based on the user input recognized after performing the operation and the sensed surrounding circumstance (S740). As described above, the electronic apparatus may determine whether there has been a misrecognition in the consecutive command section based on the information on the stored consecutive section as above.

According to an exemplary embodiment, the electronic apparatus may identify whether a stress has increased with respect to an emotional state of a user based on a user voice, a user motion and a bio-signal which were recognized in the consecutive command section as above, and if it is determined that a stress of a user has increased, the electronic apparatus may determine the corresponding consecutive command section as a section where a misrecognition has occurred.

The electronic apparatus may update a pre-stored recognition model if the performed operation has been caused by a misrecognition (S750). For example, the electronic apparatus may consider information on what voice or motion was input and what operation was performed when a misrecognition occurs, and if necessary, the electronic apparatus may also consider information on an emotional state of a user after an operation is performed and a surrounding circumstance, and update a recognition model by adjusting a setting value of the pre-stored recognition model, or transmit such information to an external server performing updating of a recognition model.

Figure 8:
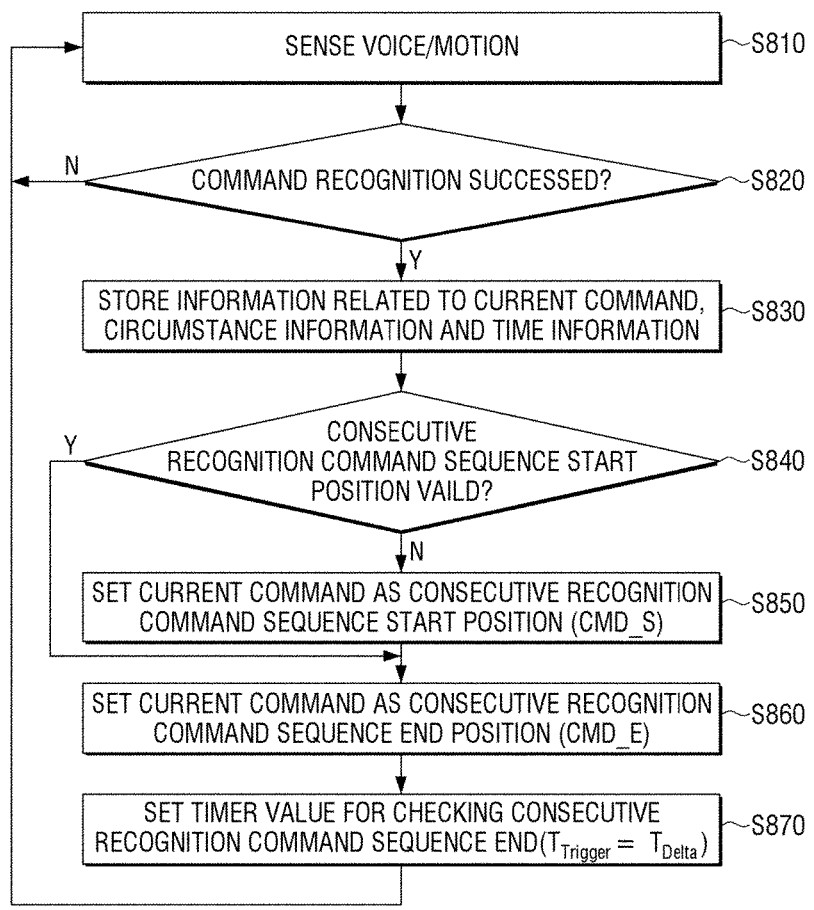
FIGS. 8 to 10 are diagrams illustrating a method of an electronic apparatus for determining whether an operation is caused by a misrecognition according to various exemplary embodiments.

FIG. 8 illustrates an exemplary embodiment of a process of determination on the aforementioned consecutive command section.

Referring to FIG. 8, when the electronic apparatus operates at first, Cmd_S and Cmd_E representing the start and the end of the consecutive command section sequence have an invalid value. According to FIG. 8, the electronic apparatus may firstly sense a voice or a motion (S810). If it is determined that the command corresponding to the sensed voice or the sensed motion has been successfully recognized (S820), the electronic apparatus may store information on the recognized command, information on a surrounding circumstance when recognizing the command and time information (S830). Then, the electronic apparatus may determine whether the start position of the consecutive command section sequence is valid (S840). If the Cmd_S which is the start position value of the consecutive command section sequence has an invalid value, a currently recognized command is set as the start position of the consecutive command section sequence (S850). The Cmd_E value representing the end position of the consecutive command section sequence may be set to indicate the position of the currently recognized command (S860), and when the consecutive command section sequence ends, the timer value that is used to determine whether there has been a misrecognition with respect to the pre-input recognition command is changed to an initial value (S870) ($T_{Trigger}=T_{Delta}$). The $T_{Trigger}$ value decreases as time passes, and when $T_{Trigger}$ becomes 0, it is determined that the inputting of the consecutive recognition command has been finished.

Hereinafter, referring to FIG. 9, an exemplary embodiment of the process of obtaining a misrecognition command by sensing the situation where, as a misrecognition comes up repeatedly as a result of a voice recognition or a motion recognition while a user tries to control through a voice recognition or a motion recognition, the user gives up using the voice recognition function or the motion recognition function and changes an input means to another reliable input device (e.g., a remote controller).

Figure 9:
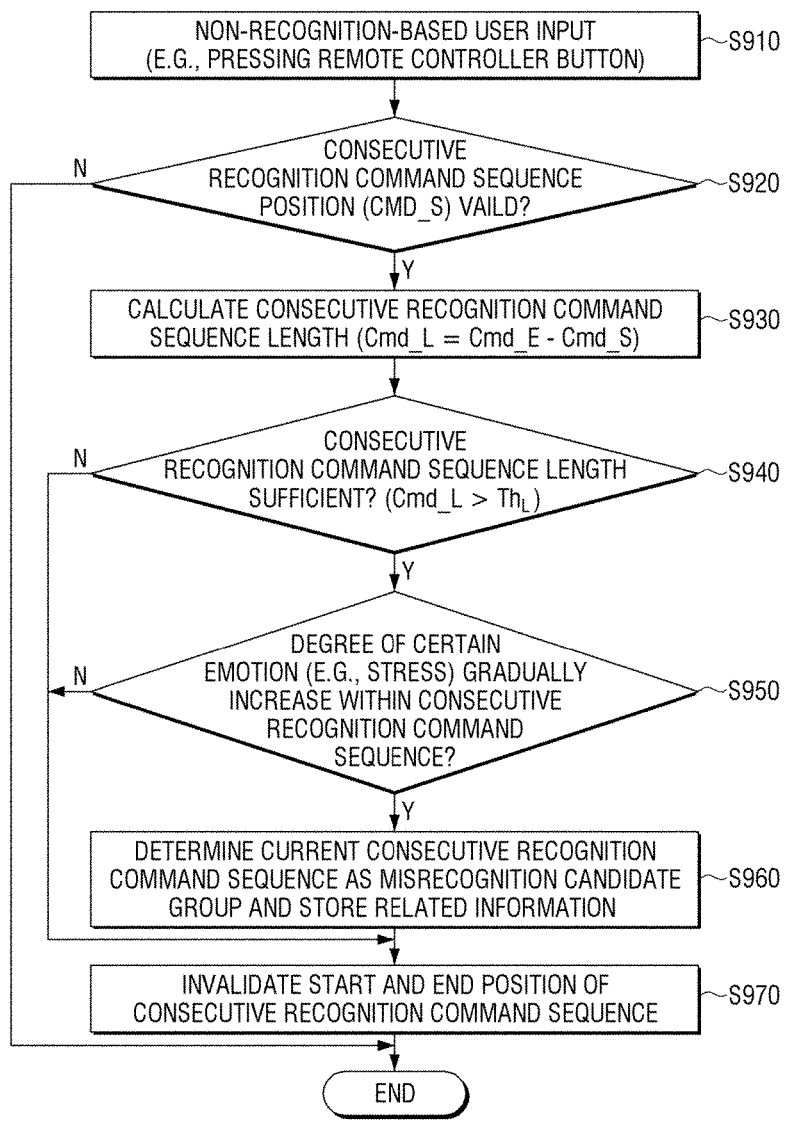

Referring to FIG. 9, if a non-recognition based user input which is not based on a user voice or a user motion is received (S910), the electronic apparatus may determine whether a consecutive recognition command section that has been input previously is present. To achieve this, the electronic apparatus may identify whether the start position value (Cmd_S) of the current consecutive recognition command sequence has a valid value (S920), and if the Cmd_S has a valid value, the electronic apparatus may calculate the length (Cmd_L) of the consecutive recognition command sequence (S930). Then, the electronic apparatus may determine whether the length of the consecutive recognition command sequence is sufficient (S940). For example, if the Cmd_L value is sufficiently large (that is, if it is larger than Th_L), it is determined that the length of the consecutive recognition command sequence is sufficient. After that, the electronic apparatus may identify whether a certain emotion (e.g., stress) of a user tends to gradually increase in the consecutive recognition command sequence section (S950), and if it is determined that the certain emotion has increased, the electronic apparatus may determine the corresponding consecutive recognition command sequence as a misrecognition candidate group where a misrecognition has occurred, and store information related to the misrecognition (S960) (the information related to a misrecognition stored as above may be collected and used to improve overall performance of a recognition device, or used to adjust recognition performance according to each individual user inside the electronic apparatus). After determining whether there has been a misrecognition with respect to the consecutive recognition command sequence, the electronic apparatus may discard the corresponding section and obtain a consecutive section with respect to recognition commands which are input subsequently. That is, an invalid value is input in the Cmd_S and Cmd_E (S970).

Figure 10:
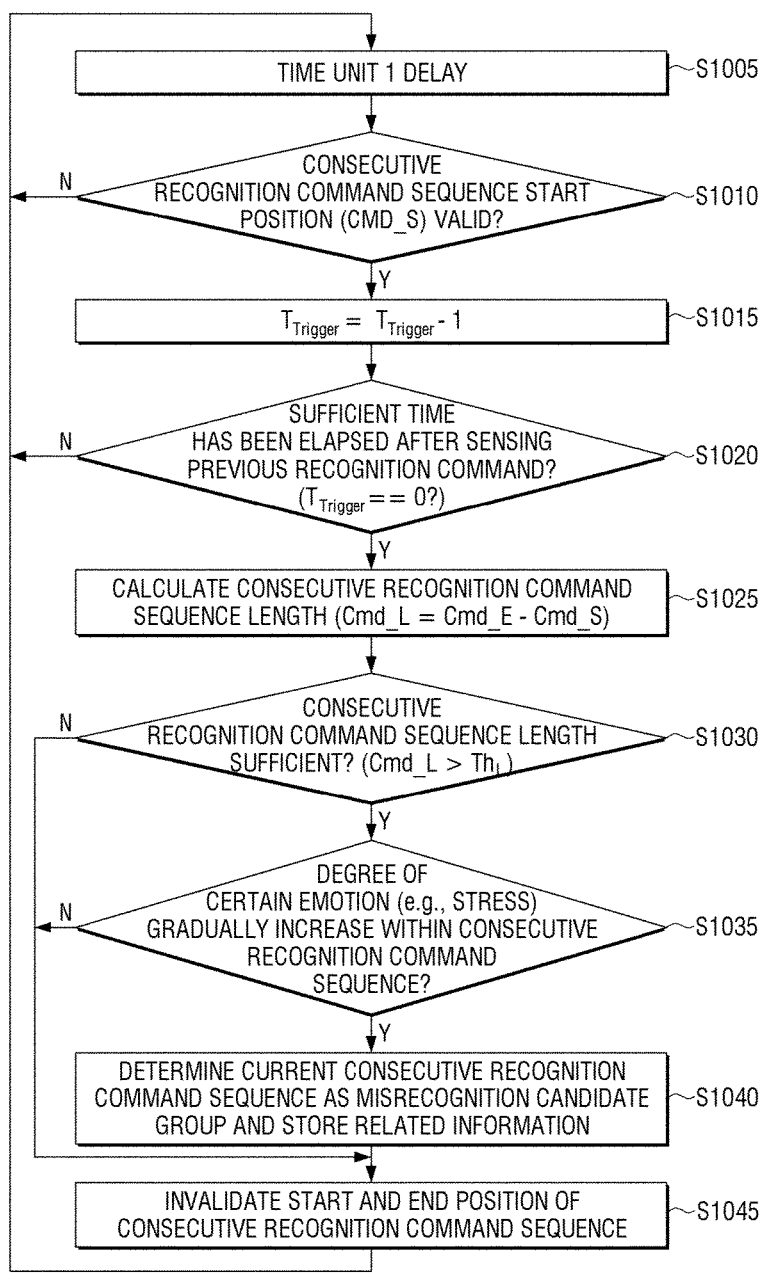

FIG. 10 is a diagram illustrating an exemplary embodiment of a misrecognition determination method for the situation where a command is input repeatedly until the command is properly recognized as illustrated in FIG. 5. If a consecutive recognition command section is present, the Cmd_S, Cmd_E and $T_{Trigger}$ values which are information on the consecutive recognition command sequence have a valid value due to the process described in FIG. 8. In FIG. 10, in order to identify the end of the consecutive recognition command, it is determined whether a consecutive recognition command section is present (S1010) whenever a certain period of time passes (S1005), and the $T_{Trigger}$ value is reduced (S1015). When the $T_{Trigger}$ value becomes 0, it is determined that there is no more consecutive command word input (S1020), and the length of the consecutive recognition command sequence (Cmd_L) is calculated (S1025). Then, the electronic apparatus may determine whether the length of the consecutive recognition command sequence is sufficient (S1030). If the Cmd_L value is sufficiently large (that is, if it is larger than Th_L), it is determined that the length of the consecutive recognition command sequence is sufficient. After that, the electronic apparatus may identify whether a certain emotion (e.g., stress) of a user tends to gradually increase in the consecutive recognition command sequence section (S1035), and if it is determined that the certain emotion has increased, the electronic apparatus may determine the corresponding consecutive recognition command sequence as a misrecognition candidate group where a misrecognition has occurred, and store information related to the misrecognition (S1040).

After determining whether there has been a misrecognition with respect to the consecutive recognition command sequence, the electronic apparatus may discard the corresponding section and obtain a consecutive section with respect to recognition commands which are input subsequently. That is, an invalid value is input in the Cmd_S and Cmd_E (S1045).

Various exemplary embodiments described above may be embodied in a recording medium that may be read by a computer or a similar apparatus to the computer by using software, hardware, or a combination thereof. According to the hardware embodiment, the exemplary embodiments that are described in the present disclosure may be embodied by using at least one selected from Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro-controllers, microprocessors, electrical units for performing other functions. In some cases, exemplary embodiments that are described in the present specification may be embodied as the processor 140. According to the software embodiment, embodiments such as processes and functions described in the present specification may be embodied as additional software modules. Each of the software modules may perform one or more functions and operations described in the specification.

The aforementioned control method for controlling an electronic apparatus according to various exemplary embodiments may be stored in a non-transitory readable medium and provided. The non-transitory readable medium may be mounted on various apparatuses.

A non-transitory readable medium is a medium which does not store data during a short-term such as a register, a cache, a memory and the like, but semi-permanently stores data, and may perform a reading through a device. To be specific, the programs for performing the various methods described above may be stored in and provided through a non-temporary reading device such as a CD, a DVD, a hard disk, Blu-Ray, a disk, an USB, a memory card, a ROM and the like.

The foregoing exemplary embodiments and advantages are merely examples and are not to be construed as limiting the exemplary embodiments. The description of the exemplary embodiments is intended to be illustrative, and not to limit the scope of the inventive concept, as defined by the appended claims, and many alternatives, modifications, and variations will be apparent to those skilled in the art.

What is claimed is:

1. An electronic apparatus comprising:
an input unit for receiving a user input;
a storage for storing a recognition model for recognizing the user input;
a sensor configured to sense a surrounding circumstance of the electronic apparatus; and
a processor configured to:
recognize the received user input based on the stored recognition model,
perform an operation corresponding to the recognized user input, and
update the stored recognition model in response to identifying that the performed operation is caused by a misrecognition based on a user input recognized after performing the operation and the sensed surrounding circumstance,
wherein the processor does not update the stored recognition model in response to identifying that the user is in a predetermined emotional state according to the user input recognized after performing the operation and that the identified predetermined emotional state is caused by a surrounding circumstance based on the sensed surrounding circumstance.

2. The electronic apparatus of claim 1, wherein the processor identifies that the performed operation is caused by a misrecognition in response to receiving a user command corresponding to another control means which is different from the received user input within a predetermined time after performing the operation.

3. The electronic apparatus of claim 1, wherein the processor identifies whether a plurality of operations are caused by a misrecognition in response to the plurality of operations being consecutively performed according to a user input within a predetermined time interval.

4. The electronic apparatus of claim 1, wherein the processor identifies whether a plurality of operations are caused by a misrecognition in response to the plurality of operations being consecutively performed according to a user input within a predetermined time interval and identifying that a degree of a certain emotion of the user gradually increases based on the user input recognized while the plurality of operations are performed.

5. The electronic apparatus of claim 1, wherein the sensor senses at least one of temperature, humidity and noise.

6. The electronic apparatus of claim 1, further comprising:
a communication interface configured to communicate with an external display apparatus,
wherein the processor transmits an image corresponding to the recognized user input to the external display apparatus through the communication interface.

7. The electronic apparatus of claim 1, further comprising:
a display configured to display an image corresponding to the recognized user input,
wherein the processor identifies whether the performed operation is caused by a misrecognition by further considering a type of an image being displayed through the display.

8. The electronic apparatus of claim 1, wherein the processor updates the stored recognition model based on information on an operation that is identified as an operation caused by a misrecognition.

9. The electronic apparatus of claim 1, wherein the storage stores recognition models for a plurality of users, each of the recognition models corresponding to a user of the plurality of users,
wherein the processor identifies a user corresponding to the received user input, and updates a recognition model corresponding to the identified user among the stored recognition models in response to identifying that the operation performed according to the received user input is caused by a misrecognition.

10. The electronic apparatus of claim 1, wherein the input unit comprises at least one of a photographing unit which photographs a user and a microphone which receives a user voice.

11. A control method for controlling an electronic apparatus, the method comprising:
receiving a user input;
recognizing the received user input based on a recognition model for recognizing a user input which is pre-stored in the electronic apparatus and performing an operation corresponding to the recognized user input;
sensing a surrounding circumstance of the electronic apparatus;
identifying whether the performed operation is caused by a misrecognition based on a user input recognized after performing the operation and the sensed surrounding circumstance; and
updating the stored recognition model in response to identifying that the performed operation is caused by a misrecognition,
wherein the identifying comprises identifying that the preformed operation is not caused by a misrecognition in response to identifying that the user is in a predetermined emotional state according to the user input recognized after performing the operation and that the identified predetermined emotional state is caused by the surrounding circumstance based on the sensed surrounding circumstance.

12. The method of claim 11, wherein the identifying comprises identifying that the performed operation is caused by a misrecognition in response to receiving a user command corresponding to a control means which is different from the received user input within a predetermined time after performing the operation.

13. The method of claim 11, wherein the identifying comprises identifying whether a plurality of operations are caused by a misrecognition in response to the plurality of operations being consecutively performed within a predetermined time interval.

14. The method of claim 11, wherein the identifying comprises identifying whether a plurality of operations are caused by a misrecognition in response to the plurality of operations being consecutively performed according to a user input within a predetermined time interval and identifying that a degree of a certain emotion of the user gradually increases based on the user input recognized while the plurality of operations are performed.

15. The method of claim 11, wherein the performing an operation corresponding to the recognized user input comprises displaying an image corresponding to the recognized user input through a display of the electronic apparatus.

16. The method of claim 11, wherein the identifying comprises identifying whether the performed operation is caused by a misrecognition by further considering a type of an image being displayed through a display of the electronic apparatus.

17. The method of claim 11, wherein the updating the stored recognition model comprises updating the stored recognition model based on information on an operation identified as an operation caused by a misrecognition.

18. A non-transitory recording medium in which a program for performing a control method for controlling an electronic apparatus is stored, the method comprising:
receiving a user input;
recognizing the received user input based on a recognition model for recognizing a user input which is pre-stored in the electronic apparatus and performing an operation corresponding to the recognized user input;
sensing a surrounding circumstance of the electronic apparatus;
identifying whether the performed operation is caused by a misrecognition based on a user input recognized after performing the operation and the sensed surrounding circumstance; and
updating the stored recognition model in response to identifying that the performed operation is caused by a misrecognition,
wherein the identifying comprises identifying that the performed operation is not caused by a misrecognition in response to identifying that the user is in a predetermined emotional state according to the user input recognized after performing the operation and that the identified predetermined emotional state is caused by the surrounding circumstance based on the sensed surrounding circumstance.

\* \* \* \* \*